(12) United States Patent
Perhats, Sr.

(10) Patent No.: US 6,926,207 B2
(45) Date of Patent: Aug. 9, 2005

(54) DIVIDED OR INTERCONNECTED AFTER-RUN VEHICLE INTERIOR HEATING SYSTEM

(76) Inventor: Frank J. Perhats, Sr., 607 Old Barn Rd., Lake Barrington, IL (US) 60010-6211

( * ) Notice: Subject to any disclaimer, the term of this patent is extended or adjusted under 35 U.S.C. 154(b) by 8 days.

(21) Appl. No.: 10/626,153

(22) Filed: Jul. 24, 2003

(65) Prior Publication Data

US 2005/0051638 A1 Mar. 10, 2005

(51) Int. Cl.[7] .................................................. B60H 1/02
(52) U.S. Cl. ........................ 237/12.3 C; 165/41; 165/42
(58) Field of Search ........................ 237/12.3 B, 12.3 C; 165/41, 42

(56) References Cited

U.S. PATENT DOCUMENTS

| | | | | |
|---|---|---|---|---|
| 2,230,051 A | * | 1/1941 | Conklin | 237/12.3 B |
| 3,269,653 A | * | 8/1966 | Howard | 237/12.3 R |
| 4,893,845 A | * | 1/1990 | Bartholomew | 285/124.4 |
| 5,294,050 A | * | 3/1994 | Hoffman et al. | 237/2 A |
| 5,456,408 A | * | 10/1995 | Appel | 237/2 A |
| 5,722,588 A | * | 3/1998 | Inoue et al. | 237/12.3 C |
| 6,082,625 A | * | 7/2000 | Faccone et al. | 237/12.3 C |
| 6,083,099 A | * | 7/2000 | Brown | 454/121 |
| 6,116,513 A | * | 9/2000 | Perhats, Sr. | 237/2 A |
| 6,386,844 B1 | * | 5/2002 | Chen et al. | 417/423.15 |
| 6,491,536 B1 | * | 12/2002 | Torii | 439/246 |
| 6,601,639 B2 | * | 8/2003 | Shibata | 165/42 |

* cited by examiner

*Primary Examiner*—Derek S. Boles
(74) *Attorney, Agent, or Firm*—Cook, Alex, McFarron, Manzo, Cummings & Mehler, Ltd.

(57) ABSTRACT

An after-run heating system for a vehicle includes a pump and a control circuit therefor located in the engine compartment and a separate vehicle fan control circuit located in the passenger compartment. The after-run heating system is configurable at the time of installation as an interconnected system or as a divided system. The interconnected system has direct electrical connections between the control circuits. The divided system has no mechanical, electrical or electromagnetic connections between the control circuits. The components in both the engine and passenger compartments function co-dependently, either as an interconnected system or as a divided system.

17 Claims, 3 Drawing Sheets

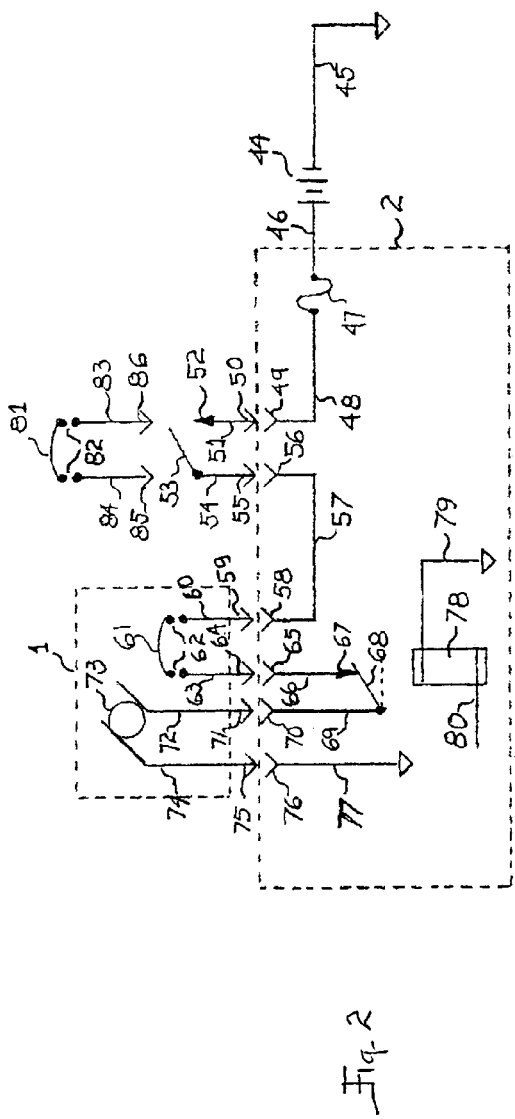
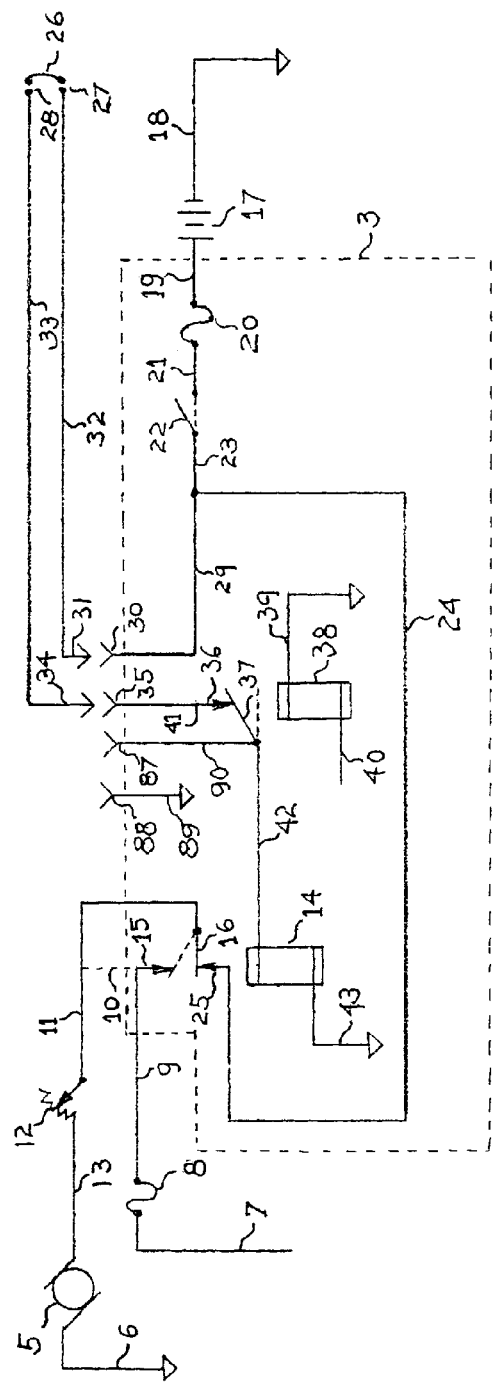

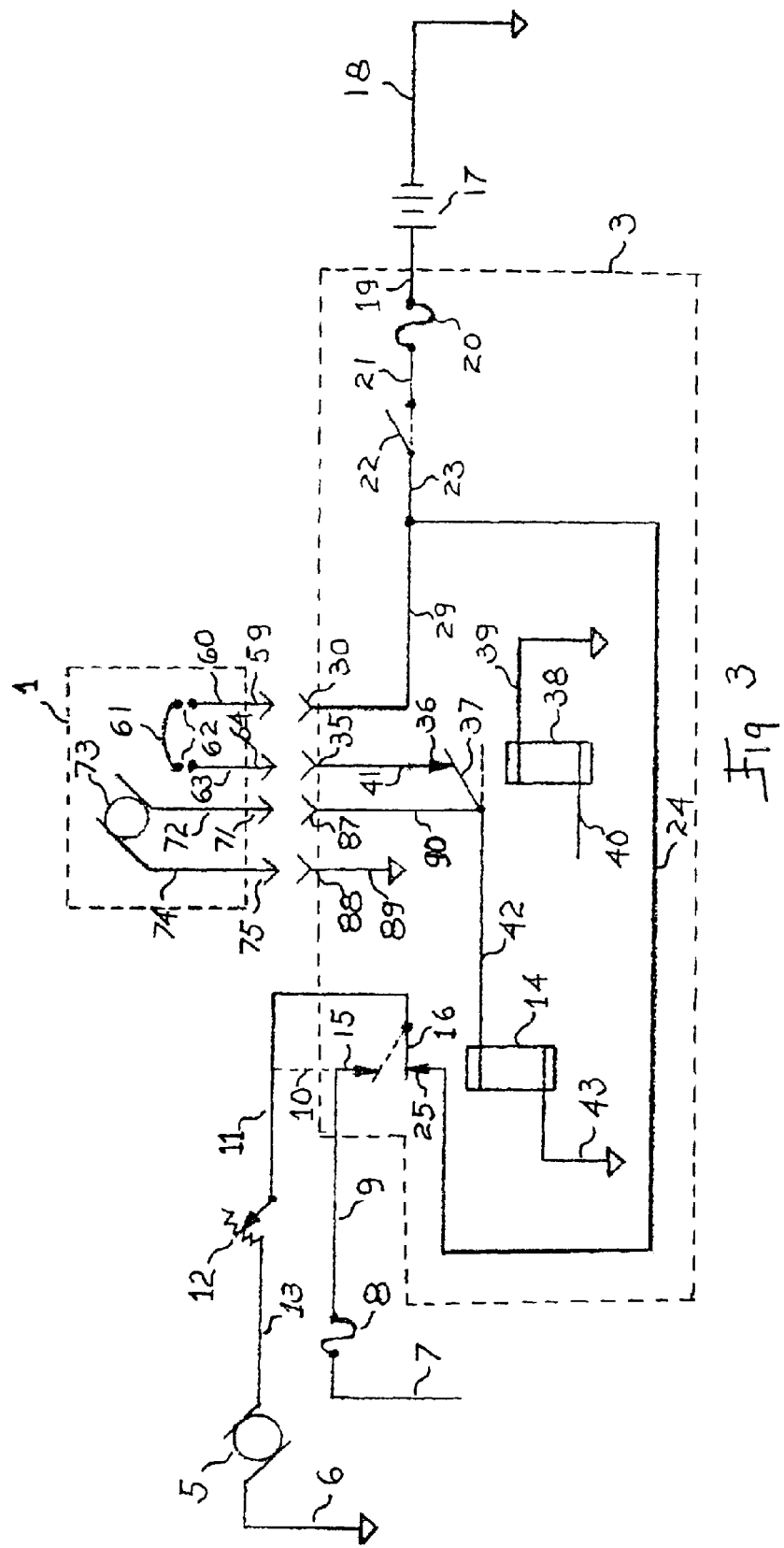

DIVIDED OR INTERCONNECTED AFTER-RUN VEHICLE INTERIOR HEATING SYSTEM

BACKGROUND OF THE INVENTION

The present invention generally relates to automotive and vehicular heating systems, and more particularly, to an improved separated or connected system for continuing the heating of an automotive or vehicular interior after the engine has been turned off.

In conventional vehicular heating systems having a water-cooled engine, a hot water circulation conduit or circuit is provided which uses the heated engine coolant to provide heat to the passenger compartment of the vehicle. When the engine is operating, hot coolant from the engine is circulated through a heater core. A heater fan pushes air through the core, where it is heated by the hot engine coolant, and then into the passenger compartment. Accordingly, in these conventional heating systems, it was necessary to leave the engine idling, even when the vehicle was stationary or unoccupied, in order to keep a vehicle's passenger compartment warm. Only with the engine idling could hot coolant be pumped through the heater core. Such excessive idling causes unnecessary fuel consumption and air pollution.

In order to prevent such excessive idling, after-run heaters have been developed for continuing the heating of vehicle interiors even after the engine is turned off. After-run heaters utilize much of the coolant heat by transferring it into the passenger compartment. An example of such a heater is shown in Perhats, U.S. Pat. No. 4,308,994, the disclosure of which is incorporated herein by reference. A magnetically-coupled pump with low battery drain, along with auxiliary control components, is utilized to circulate the still-hot engine coolant through the vehicle's heater core and to run the vehicle's heater fan while the engine is off.

Those skilled in the art will recognize that systems of the type shown in the U.S. Pat. No. 4,308,994 require the interconnection between components located within the passenger compartment and components located within the engine compartment. More specifically, components such as the seasonal switch, indicator and fan motor controls are located in the passenger compartment inside or under the dash, whereas the engine coolant pump and temperature sensor are located in the engine compartment. The interconnection of these components requires the installing of wiring through the firewall between the two compartments. The wiring may pass through the firewall. This type of system is referred to herein as an interconnected system. Those skilled in the art will recognize that, depending on the specific configuration of the vehicle's firewall, engine compartment and dash, installation of an interconnected system can prove to be time-consuming, difficult, and therefore very costly.

These problems were addressed in the after-run heater of Perhats, U.S. Pat. No. 6,116,552, the disclosure of which is incorporated herein by reference. A pump and first control circuit therefore are located in the engine compartment of the vehicle. The first control circuit allows the pump to continue circulating heated engine coolant through the heater core of the vehicle after the engine has been turned off. A second control circuit, located in the passenger compartment of the vehicle, continues to operate the heater fan which blows air through the heater core and into the passenger compartment after the engine has been turned off. The first and second control circuits have no mechanical, electrical or electromagnetic interconnection therebetween but nevertheless are interrelated and codependent. This type of system is referred to herein as a divided system.

Those skilled in the art will recognize that installation of after-run heating systems involves a broad range of vehicles sizes, types and styles. Accordingly, the system and its installation can prove to be costly due to the required specificity in manufacture, distribution and inventory for each vehicle. Furthermore, in some vehicles the arrangement of the heating system, firewall and related components renders installation of the interconnected after-run heating system relatively straightforward. That is, there is no need for the divided system of the U.S. Pat. No. 6,116,552. In other vehicles it can range from difficult to impossible to install the interconnected system of the U.S. Pat. No. 4,308,994. In such vehicles the divided after-run heating system of the U.S. Pat. No. 6,116,552 is required.

SUMMARY OF THE INVENTION

In view of the foregoing, it is desirable to develop an after-run heating system which is configurable at installation as an interconnected system, with through the firewall connections, or as a divided system, with no mechanical, electrical or electromagnetic connection extending through the firewall.

It is further desirable to develop an after-run heating system whose passenger and engine components are easily interconnected between the firewall placed therebetween.

It is further desirable to develop an after-run heating system which accommodates the varying installation needs of vehicles of varying size, type and style.

The present invention provides a system for controlling after-run heating of a vehicle's interior comprising, a pump and a control means thereof, usually located in the engine compartment, and a related but separate vehicle fan control means located in the driver's compartment. This after-run heating system is configurable at installation as a single interconnected system or as a divided system with no mechanical, electrical or electro-magnetic connection between the separated components. The components in both the engine and passenger's compartments function synergistically and co-dependently, either as an interconnected or divided system.

The present invention provides a single, convertible system, that can be configured by the installer at the time of installation, as a single, interconnected system or, when necessary, as a divided system with engine compartment and passenger compartment components separated mechanically, electrically, and electro-magnetically but operating together as functionally codependent elements of the system.

These and other desired benefits of the preferred forms, including combinations of features thereof, of the invention will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 1 is a circuit diagram of a fan control system, located in the passenger compartment, installed as a separated system.

FIG. 2 is a circuit diagram of a pump/thermostat control system, located in the engine compartment, installed as a separated system.

FIG. 3 is a circuit diagram of a fan control system and a pump/thermostat control system, connected to one another so as to form a directly connected system.

DETAILED DESCRIPTION OF THE INVENTION

Figure 4:
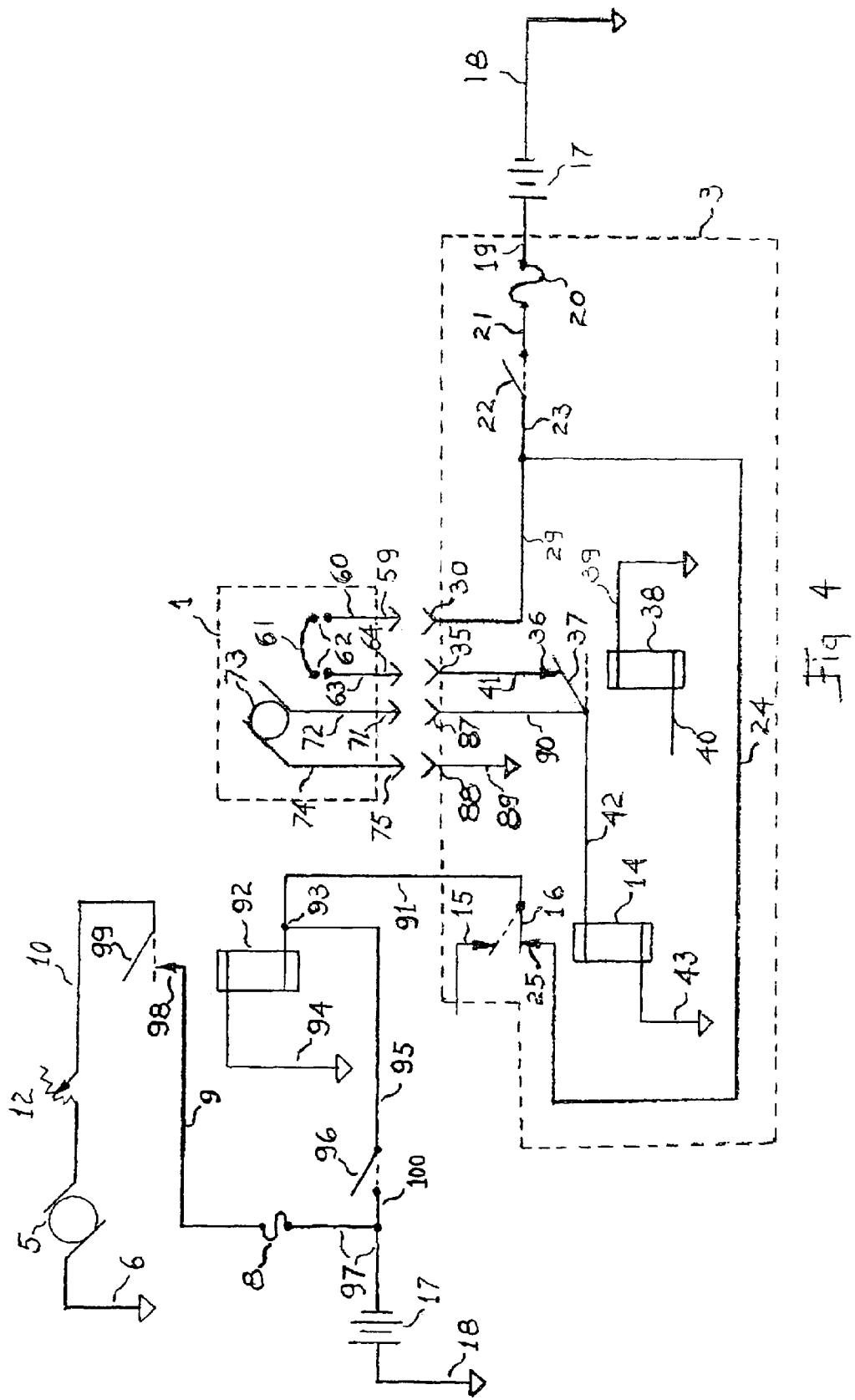
FIG. 4 is a circuit diagram of an alternate embodiment, showing connection between the fan control component and an existing vehicle heater fan when a heater relay is available.

Looking at FIG. 1, vehicular heating systems, even those not having an after-run heating system, generally comprise a heater fan motor 5 connected to a power source through line 7. The power source is typically in the form of a battery or alternator. A ground line 6, a fuse/circuit breaker 8, and a fan speed control switch 12 complete the fan motor circuit. When the vehicle ignition is turned on, the heater fan motor 5 is connected to the power source, via an existing power supply conductor 7. On the other hand, when the vehicle ignition is off, the heater fan motor 5 is disconnected from the power source so that the heater fan motor 5 will not operate even if the fan speed control switch 12 is on.

In accordance with the goals of this invention, the main functioning components that provide pumping and engine coolant temperature sensing (module 1 of FIGS. 1 and 2, and the fan control module 3 of FIGS. 1 and 3) are convertible at installation, that is, they can be set up either as a separated, unconnected system or as a connected system with through-the-firewall connections. These components are identically-configured, whether the system is separated or connected.

FIGS. 1 and 3 illustrate an after-run heating system which uses the existing vehicle heater to continue vehicle interior heating. More specifically, a method for directly connecting an after-run heating circuit to an existing heater fan includes severing conductors 9 and 11 and inserting the fan control module 3 into the fan circuit as follows. Conductor 11 is connected to the movable transfer contact 16 of a fan control relay 14. Conductor 9 is connected to a fixed contact 15. With fan control relay 14 dormant (ignition on), the original source of heater fan power is restored, with the transfer contact 16 of fan control relay 14 closed upon fixed contact 15. This causes current to flow from the power source, to fuse/circuit breaker 8, to fan control relay 14, to the fan speed control switch 12, and to the heater fan motor 5.

The after-run heating system may be adapted such that fan control module 3 controls the heater fan motor 5. Fan control module 3 is connected to vehicle battery 17 via conductor 19, vehicle battery 17 being further connected to vehicle ground by way of conductor 18. During normal operation of the vehicle during winter, the existing vehicle heater is supplied with hot engine coolant by way of the engine coolant pump. Heat from the engine coolant is transferred to the passenger compartment by the running of the heater fan motor 5. Thermostat 26 of fan control module 3 is located in the heater plenum chamber outlet. When heated by the warm air emanating from the heater during normal winter vehicle operation, thermostat 26 closes contacts 27, 28.

With contacts 27, 28 closed and after-run heating system on/off switch 22 closed, battery power from vehicle battery 17 is supplied to fuse/circuit breaker 20, to on/off switch 22, to a connector receptacle 30, to a connector plug 31, to plenum air sensing thermostat 26, to a connector plug 34, to a connector receptacle 35, and to the contacts of an ignition-on sensing relay 38. Ignition-on sensing relay 38 is connected to vehicle ground via conductor 39 and is powered via conductor 40, which may be connected to any power source that cycles on and off with vehicle ignition.

When the vehicle ignition is turned on, power is supplied to relay 38 which causes movable contact 37 to disengage from fixed contact 36, thereby opening the power supply circuit to fan control relay 14. When fan control relay 14 is dormant, movable contact 16 is positioned on fixed contact 15, thereby returning fan control to its original vehicle power source. When vehicle ignition is turned off, battery power is removed from conductor 40 and ignition-on sensing relay 38 becomes dormant, thereby causing contact 37 to reengage contact 36, transferring battery power to fan control relay 14, and causing contact 15 to engage with contact 25 via contact 16.

In an alternate embodiment, an after-run heating system may be adapted such that power to heater fan motor 5 may be controlled by fan control module 3. With on/off switch 22 closed, power is supplied by battery 17 to fuse/circuit breaker 20, to on/off switch 22, to fan control relay 14, to fan speed control switch 12, and to heater fan motor 5, thereby placing heater fan motor 5 under the operating control of fan control module 3 and allowing the fan motor 5 to run even with the ignition and engine turned off.

FIG. 2 illustrates a circuit diagram of a pump/thermostat and control system therefor, located in the engine compartment and installed as a separated system. Pump control module 2 is generally connected to pump/thermostat module 1. Vehicle battery 44 is connected to ground via conductor 45. Vehicle battery 44 provides power to pump control module 2, to fuse 47, to connector receptacles at connections at 49 and 56, to connector receptacle at 58 via conductor 57, and to a thermostat plug 59 of pump/thermostat module 1.

When the vehicle is driven, the engine pump forces hot engine coolant through the dormant after-run heating system pump 73. The after-run heating system pump may be generally located in series with the supply hose of the vehicle passenger compartment heater. Thermostat 61 is generally an integral part of the pump/thermostat module 1. Thermostat 61 senses the heated coolant and is adapted to open or close contacts 62. For example, thermostat may sense the heated coolant and close contacts 62 upon sensing a temperature of 160° F and opens contacts 62 when coolant temperature is reduced to approximately 95° F. Accordingly, battery power is transferred from the plug 59 to thermostat 61, to plug 64, to connector receptacle 65, and to the contacts 67, 68 of ignition-on sensing relay 78. When the vehicle engine is running, battery power is supplied to ignition-on sensing relay 78, which thereupon opens fixed contact 67 from engagement with moveable contact 68. Hot water continues to be supplied to the vehicle heater by way of the engine pump.

When the ignition is turned off, battery power is removed from conductor 80, such that ignition-on sensing relay 78 becomes dormant. Ignition-on sensing relay 78 then closes moveable contact 68 which engages fixed contact 67, thereby transferring battery power from the thermostat 61, to ignition-on sensing relay contacts 67, 68, to a connector receptacle 70, to a plug 71, to after-run heating system pump 73, to ground via conductor 74, plug 75, connector receptacle 76 and conductor 77. In this arrangement, the after-run heating system pump 73 commences pumping hot engine coolant to the vehicle passenger compartment heater, thereby effectively substituting the pumping action of the engine pump. This assembly may be used in conjunction with fan control module 3, which continues heater fan operation as discussed above. Those skilled in the art will appreciate that such interacting assembly allows for the passenger compartment of the vehicle to be heated, even with the engine and ignition turned off.

As the after-run heating system continues to operate, thermostat 61 may be adapted to open contacts 62 when the engine coolant drops to a designated temperature, thereby terminating operation of the after-run heating system pump 73. For example, the thermostat 61 may be adapted to terminate the after-run heating system pump 73 when engine coolant drops to approximately 95° F. In the separated system embodiment of FIG. 1 and FIG. 2, the after-run heating system pump 73 ceases to pump cool engine coolant to the passenger compartment heater, which thereupon begins to cool plenum air sensing thermostat 26 located in the heater air plenum. At a designated temperature, plenum air sensing thermostat 26 is adapted to terminate heater fan operation by opening contacts 27, 28 such that fan control relay 14 becomes dormant and allows existing vehicle systems to control heater fan motor 5. With the ignition turned off, the power supply line 7 of the heater fan motor 5 is un-powered such that heater fan motor 5 ceases operation.

In view of the foregoing, there is no electrical, mechanical or electromagnetic connection between pump/thermostat module 1 and heater fan module 3. Therefore, the systems operate independently, but synergistically, to initiate and terminate the heating operation of the existing vehicle heater with the engine turned-off. Those skilled in the art will recognize and appreciate that this elimination of idling allows for the decrease of fuel consumption, air pollution and costs in commercial operations.

It will be realized that the heater fan module 3 may be adapted to be turned off, i.e. for seasonal operation, by operating on/off switch 22 of fan control module 3, which is located in the passenger compartment. Also, pump/thermostat module 1 and control means 2 thereof may be adapted to be turned off through the operation of a seasonal on/off switch 53. The pump/thermostat module 1 may also be adapted to accommodate automatic termination. For example, an ambient temperature sensor 81 may be substituted for the manual on/off switch 53. In this case the on/off switch 53 plugs 50, 55 are disengaged from connector receptacles 49, 56 and replaced by the ambient sensor 81 with its plugs 85, 86. Accordingly, ambient sensor 81 may open or close contacts 82, thereby terminating or commencing operation of pump/thermostat module 1.

FIG. 3 illustrates the heater fan control module 3 of FIG. 1 being directly connected to pump/thermostat module 1 of FIG. 1 as an integrated system. In the directly connected system the plenum air sensing thermostat 26 and pump control module 2 are disconnected and removed from the system.

In this configuration and during normal vehicle operation (engine running), fan control module 3 operates as follows: with system on/off switch 22 open and ignition on, the after-run heating system is disconnected from battery 17 and remains non-operational when the engine is turned off. Fan control relay 14 is also unpowered with transfer contact 16 being closed upon contact 15. Instead, the normal power source through line 7 provides power to heating fan motor 5, which is connected to fuse/circuit breaker 8, to fan control relay 14, and to fan speed control switch 12, thus providing air movement means for the passenger cabin.

With the ignition and engine turned off, battery 17 supplies power to fan control module 3, which is connected to fuse/circuit breaker 20 and on/off switch 22. Without battery power, the pump/thermostat module 1 is unpowered and after-run heating system pump 73 is dormant. If required while the vehicle is being driven, vehicle interior heating may be provided by the engine pump circulating engine coolant through the dormant after-run heating system pump 73 located in series with the hose supplying hot engine coolant to the vehicle heater. The flow of hot coolant also heats thermostat 61, thereby closing contacts 62. When engine (ignition) is turned off, the after-run heating system does not operate because on/off switch 22 remains open. The on/off switch 22 may be turned on or off at any time during vehicle operation. With on/off switch 22 turned on when engine is turned off, the after-run heating system is adapted to automatically pump hot engine coolant.

When the engine is turned off and on/off switch 22 and thermostat 61 are closed, the system operates as follows: power is transferred from battery 17 to fuse/circuit breaker 20, to on/off switch 22, to the connector receptacle 30, to plug 59, to closed contacts 62 of thermostat 61, to plug 64, to connector receptacle 35, and to the contacts 36, 37 of the ignition-on sensing relay 38. With the ignition turned off, ignition-on sensing relay 38 does not receive power from conductor 40. Therefore, upon transfer contact 37 being closed upon engagement with fixed contact 36, power is transferred at conductors 90 and 42.

In this arrangement, power is transferred from battery 17 from conductor 90 to after-run heating system pump 73, to continue circulation of hot water to vehicle heater with the engine turned off. At the same time, power is transferred from battery 17 to fan control relay 14, through closed on/off switch 22, and fuse/circuit breaker 20. Conductor 11, being connected to transfer contact 16 of fan control relay 14, it powers heating fan motor 5 by way of fan speed control switch 12, thereby causing heating fan motor 5 to run in conjunction with after-run heating system pump 73. This assembly allows for passenger compartment to be heated even with the engine turned off.

As the after-run heating system continues to operate, the thermostat 61 may be adapted to open contacts 62 when the engine coolant reaches a designated temperature, thereby terminating operation of the after-run heating system pump 73. For example, the time thermostat 61 may be adapted to terminate the after-run heating system pump 73 when it drops to approximately 95° F. In one embodiment, time thermostat 61 is adapted to interrupt battery power to after-run system pump 73 and fan control relay 14, thereby placing both in a state of dormancy and transferring contact 16 to re-engage with contact 15. This engagement returns the heater fan motor 5 to be controlled and powered by the original control power sources.

Heater fan module 3 may also be adapted to be turned off, i.e. for seasonal operation, by operating on/off switch 22 of fan control module 3, which is located in the passenger compartment.

An alternate method for connection to heating fan motor 5 is shown in FIG. 4. A conductor 91 is connected to transfer contacts 16 of fan control module 3 and fan control relay 14 by replacing conductor 11 in either FIG. 1 or 3. The other end of conductor 91 is connected to existing vehicle heater relay 92 at the relay's positive terminal 93. This arrangement is adapted such that power is transferred to relay 92 when after-run heating system is turned on and vehicle ignition switch 96 is turned off. This arrangement is further adapted such that when vehicle ignition switch 96 is turned on, power from the battery 17 is transferred to existing heating relay 92 and contacts 98, 99 are closed. Upon closure of contacts 98, 99, power is supplied from existing fuse/circuit breaker 8, to vehicle heater relay 92, contacts 98, 99, to fan speed control 12, and to heating fan motor 5.

When either the vehicle ignition switch 96 or after-run heating system are turned off, power to vehicle heater relay 92 is interrupted, thereby opening contacts 98, 99 and interrupting power to the heating fan motor 5. Thus, with the after-run heating system on and hot engine coolant present in the engine cooling system, cycling of vehicle ignition switch 96 alternately on and off puts heating fan motor 5 under the control of either the after-run heating system or original vehicle control.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. For example, the temperature settings of the referenced thermostats could be other than those indicated. Also, the various components shown as mechanical sensors, circuit breakers, and electromagnetic relays could have electronic equivalents substituted therefor. A battery voltage monitor or timing device could also be placed in circuit to terminate system operation upon encountering low battery voltage or after a designated time period. An auxiliary battery or multiple vehicle batteries connected in parallel or with battery isolators for supplying power only to the after-run heating system from only one of the group of batteries, while being capable of being charged by the vehicle engine alternator, are all also contemplated. The locations of the plugs and connectors could be reversed, i.e., the module shown having a receptacle could have a plug and the mating module would have a receptacle instead of the plug as shown. Also, it will be understood that the plugs and receptacles could be at the ends of wires having a length suitable for the particular needs of a specific installation.

Furthermore, it will be appreciated that any such changes and modifications will be recognized by those skilled in the art as an equivalent to one or more elements of the following claims, and shall be covered by such claims to the fullest extent permitted by law.

I claim:

1. In a vehicle of the type having an engine compartment and a passenger compartment, an engine cooled by a liquid coolant which is circulated by a water pump through the engine, a heating conduit, a heater core in communication with an air plenum, a vehicle electrical system including a battery, a heater fan in the passenger compartment for circulating air through the heater core and into the passenger compartment, the improvement comprising an after-run heating system kit for continuing heating of the passenger compartment after the engine has been shut off, comprising:
   a first control circuit for mounting in the engine compartment and a second control circuit for mounting in the passenger compartment, the first control circuit having a plurality of one of removable electrical plugs or connector receptacles, the second control circuit having a plurality of the other of removable electrical plugs or connector receptacles, the plugs and receptacles being removably engageable with one another for selectably installing an interconnected after-run heating system by electrically connecting the first and second control circuits to one another;
   a pump control circuit having a plurality of said other of removable electrical plugs or connector receptacles so as to be selectably electrically connectable to the first control circuit; and
   an air thermostat having a plurality of said one of removable electrical plugs or connector receptacles so as to be selectably electrically connectable to the second control circuit, the pump control circuit and air thermostat being installed if a divided after-run heating system is desired.

2. The kit of claim 1 further characterized in that the first control circuit is a pump/thermostat control circuit located in the engine compartment of the vehicle and includes an auxiliary pump disposed in the heating conduit and controlled by the pump/thermostat control circuit for pumping heated engine coolant through the heater core of the vehicle after the engine has been turned off.

3. The kit of claim 2 further characterized in that the second control circuit is a fan control circuit located in the passenger compartment of the vehicle and controls operation of the heater fan after the engine has been turned off.

4. The kit of claim 3 further characterized in that the pump control circuit is adapted for mounting in the engine compartment, and is connectable to the vehicle electrical system and to the first control circuit for controlling operation of the auxiliary pump while being free of mechanical, electrical or electromagnetic interconnection to the fan control circuit.

5. The kit of claim 1 further characterized in that the second control circuit is a fan control circuit which controls operation of the heater fan after the engine has been turned off.

6. The kit of claim 1 further characterized in that the air thermostat is mountable in the air plenum for sensing the temperature of air flowing into the passenger compartment.

7. The kit of claim 1 further comprising a seasonal on-off switch having a pair of said one of removable electrical plugs or connector receptacles selectably connectable to said other of removable electrical plugs or connector receptacles of the pump control circuit.

8. The kit of claim 1 further comprising an ambient temperature sensor having a pair of said one of removable electrical plugs or connector receptacles selectably connectable to said other of removable electrical plugs or connector receptacles of the pump control circuit.

9. The kit of claim 1 further characterized in that the second control circuit is a fan control circuit which controls operation of the heater fan after the engine has been turned off and further comprising a relay between the second control circuit and the heater fan.

10. In a vehicle of the type having an engine compartment and a passenger compartment, an engine cooled by a liquid coolant which is circulated by a water pump through the engine, a heating conduit, a heater core in communication with an air plenum, a vehicle electrical system including a battery, a heater fan in the passenger compartment for circulating air through the heater core and into the passenger compartment, the improvement comprising an after-run heating system kit having a first set of components mountable in the engine compartment, and a second set of components mountable in the passenger compartment, the first and second sets of components being arranged so as to be installable either as a divided system or as an interconnected system.

11. The kit of claim 10 further characterized in that the first set of components includes a pump/thermostat control circuit and an auxiliary pump disposed in the heating conduit and controlled by the pump/thermostat control circuit for pumping heated engine coolant through the heater core of the vehicle after the engine has been turned off.

12. The kit of claim 11 further characterized in that the second set of components includes a fan control circuit which controls operation of the heater fan after the engine has been turned off.

13. The kit of claim 12 further comprising a pump control circuit adapted for mounting in the engine compartment, the pump control circuit being connectable to the vehicle electrical system and to the first control circuit for controlling operation of the auxiliary pump while being free of mechanical, electrical or electromagnetic interconnection to the fan control circuit.

14. The kit of claim 12 further comprising a relay between the second control circuit and the heater fan.

15. The kit of claim 10 further characterized in that the second set of components includes a fan control circuit which controls operation of the heater fan after the engine has been turned off.

16. The kit of claim 10 further comprising an air thermostat mountable in the air plenum for sensing the temperature of air flowing into the passenger compartment.

17. In a vehicle of the type having an engine compartment and a passenger compartment, an engine cooled by a liquid coolant which is circulated by a water pump through the engine, a heating conduit, a heater core in communication with an air plenum, a vehicle electrical system including a battery, a heater fan in the passenger compartment for circulating air through the heater core and into the passenger compartment, the improvement comprising a method of installing an after-run heater in either a divided or interconnected system, comprising the steps of:

mounting a first control circuit in the engine compartment;

mounting a second control circuit in the passenger compartment;

electrically connecting the first control circuit directly to the second control circuit if an interconnected after-run heating system is desired;

mounting a pump control circuit in the engine compartment and electrically connecting it to the first control circuit if a divided after-run heating system is desired; and mounting an air thermostat in the passenger compartment and electrically connecting it to the second control circuit if a divided after-run heating system is desired.

* * * * *